United States Patent
Nonaka (10) Patent No.: US 6,442,344 B1
(45) Date of Patent: Aug. 27, 2002

(54) FOCUSING APPARATUS (75) Inventor: Osamu Nonaka, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/931,802

(22) Filed: Aug. 17, 2001

(30) Foreign Application Priority Data

Aug. 25, 2000 (JP) ........................... 2000-255630

(51) Int. Cl.$^7$ ............................................. G03B 13/36
(52) U.S. Cl. ........................ 396/104; 396/106; 396/109
(58) Field of Search ............................ 396/104, 106, 396/109

(56) References Cited

U.S. PATENT DOCUMENTS 4,540,881 A * 9/1985 Hayashi et al. ............. 396/104

* cited by examiner

Primary Examiner—W. B. Perkey
(74) Attorney, Agent, or Firm—Straub & Pokotylo; John C. Pokotylo (57) ABSTRACT This invention is a focusing apparatus including a pair of sensor arrays detecting object image signals obtained by a plurality of optical paths in multiple-point distance measurement, an arithmetic operation control section focusing on an object by comparison of relative positions of the object image, a light source consisting of a strobe section or a light projection section, and projecting focusing auxiliary light onto the dark object, and a determination section determining a part of a contrast equal to or greater than a preset, predetermined contrast to be a shadow based on the object image signals obtained when the auxiliary light is projected from the light source. The object image signals obtained from parts other than the part determined as the shadow are preferentially captured on each sensor array and used for focusing control.

28 Claims, 11 Drawing Sheets

FOCUSING APPARATUS

CROSS-REFERENCE TO RELATED APPLICATIONS

This application is based upon and claims the benefit of priority from the prior Japanese Patent Application No. 2000-255630, filed Aug. 25, 2000, the entire contents of which are incorporated herein by reference.

BACKGROUND OF THE INVENTION

1. Field of the Invention

The present invention relates to an apparatus, mounted on a camera, for measuring the distance of an object and focusing the lenses on the object at the time of photographing the object. More specifically, the present invention relates to a focusing apparatus for appropriately measuring the distance of an object and focusing the lenses on the object even if an auxiliary light beam is emitted and a shadow is generated in a distance measurement range on a dark scene or the like.

2. Description of the Related Art

There is known hitherto a system of a focusing apparatus, mounted on a camera, for calculating the distance of an object and a focusing position by comparing two images of one object obtained through two optical paths. According to this system, in case of a dark scene or an object without a contrast, it sometimes occurs that clear image signals for distance measurement cannot be obtained and the object cannot be focused on. To prevent this, there is known a technique for applying auxiliary light beam from a light source, e.g., a strobe, to an object when distance measurement is carried out and for emphasizing image signals for the distance measurement.

Figures 15, 16, 17:
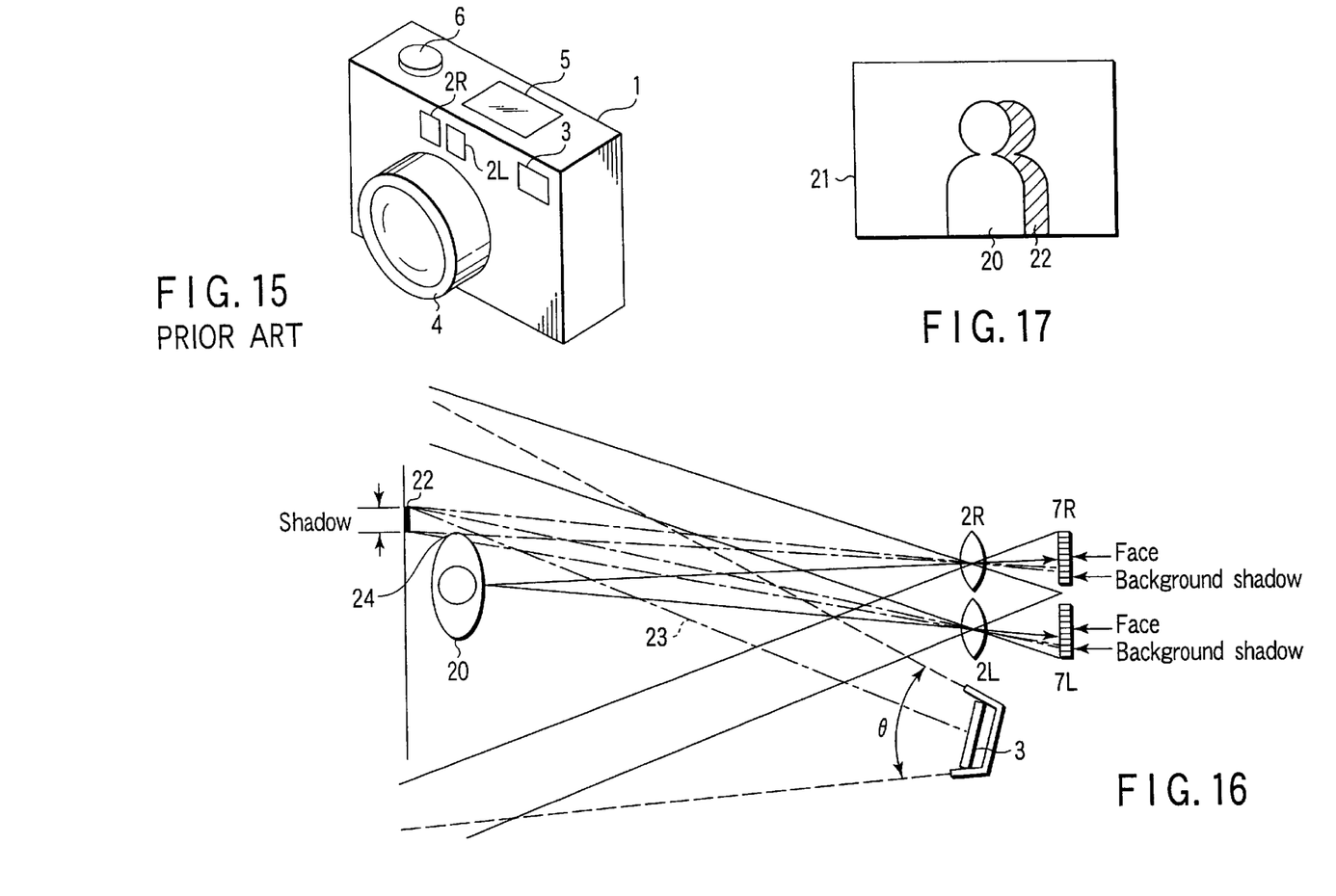
FIG. 15 shows an example of the constitution of the appearance of a conventionally ordinary camera.
FIG. 16 shows the positional relationship between an object relating to the distance measurement and the focusing apparatus in the fourth embodiment, when viewing the object and the focusing apparatus from above during photographing.
FIG. 17 shows a state in which a shadow is generated on a scene on which a wall is present right in back of an object (or a person).

FIG. 15 shows an example of the constitution of the appearance of an ordinary camera.

In FIG. 15, a pair of light receiving lenses 2R, 2L for distance measurement, a strobe section 3 and a photographic lens 4 are arranged in front of a body 1 of a camera 1. In addition, on the upper surface of the camera 1, there are arranged a release switch 6 and a display section (LCD) 5 indicating an operation mode and the number of frames of a film of the camera 1. During photographing, when a photographer operates the release button 6, strobe light is emitted and a distance is measured and exposure is carried out after focusing if an object (or a person) is dark. This strobe light is emitted as auxiliary light of a focusing distance measurement apparatus and as auxiliary light for exposure under the control of a control section provided in the camera 1.

FIG. 16 shows the positional relationship between an object and a camera in respect of distance measurement during photographing if the object and the camera are viewed from above. At the time of measuring a distance, if an object 20 is dark, strobe light is applied to the object 20 to illuminate the object 20. The illumination range is indicated by symbol θ. Reflected light from the face of the object 20 is passed through light receiving lenses 2R and 2L and incident on sensor arrays 7R and 7L, and a positional distance due to the parallax of the two lenses is accurately measured. At this time, an object distance is accurately measured under the principle of triangulation and accurate focusing is carried out.

In case of frequently employing auxiliary light during distance measurement, however, there are scenes to be noted. As shown in, for example, FIG. 17, if a wall 21 is present right in back of a principal object (or person) 20 and auxiliary light is emitted to carry out distance measurement, the distance of the object including a shadow part 22 generated by the auxiliary light is measured. This is because lenses 2R and 2L (or sensor arrays 7R and 7L) are disposed away from a strobe light emission section 3 by several centimeters on an ordinary camera. As a result, the shadow part 22 forming a large contrast image is erroneously focused on instead of the principal object in this distance measurement signal and the principal object 20 becomes disadvantageously out of focus.

BRIEF SUMMARY OF THE INVENTION

It is an object of the present invention to provide a focusing apparatus capable of adjusting the focus of a camera on an object without the influence of a wall existing in the background while utilizing auxiliary light.

To attain this object, the present invention provides a focusing apparatus for focusing on an object based on object image signals outputted from a sensor, comprising: a light projection section projecting auxiliary light for focusing onto the object; a detection section detecting a signal corresponding to a shadow part of the object generated after projecting the auxiliary light among the object image signals outputted from the sensor when the auxiliary light is projected; and a control section conducting focusing control based on the object image signals outputted from the sensor when the auxiliary light is projected except for the image signal corresponding to the shadow part detected by the detection section.

According to the focusing apparatus constituted as stated above, the focusing auxiliary light is projected onto a dark object from the light projection section to detect the object image signals obtained by a plurality of optical paths in multiple-point distance measurement. Among the object image signals obtained from a pair of sensor arrays capturing reflected light of the auxiliary light, a part having a greater contrast than a preset contrast is determined as a shadow and focusing control is exercised using the object image signals of parts other than the part determined as a shadow by the control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

The embodiments of the present invention will be described hereinafter in detail with reference to the accompanying drawings.

First, the concept of a focusing apparatus according to the present invention will be described.

The present invention is intended to prevent an object from becoming out of focus due to the influence of a shadow contrast as shown in FIG. 17. That is, the positions of a shadow on two sensor arrays 7R and 7L generated because a shadow image on the wall 21 incident on the two sensor arrays 7R and 7L becomes unbalanced due to the relationship between the position of strobe light and the position of the light receiving lens. The positions are detected, an object position is obtained from object image signals (to be referred to as "image signals" hereinafter) obtained from the sensor arrays except the detected positions, and focus adjustment is carried out, thereby preventing a principal object from becoming out of focus.

The unbalanced state means as follows. While the outside of a shadow part 22 is not influenced by the principal points of the lenses but determined by the relationship between the light beam 23 of the strobe section 3 and the outline part 24 of the person 20, the inside of the shadow part 22 is determined by the principal points of the light receiving lenses 2R and 2L and the outline part 24 of the person 20. Due to this, the sensor 7R distant from the strobe section 3 obtains a wide background shadow image and the sensor 7L close to the strobe section 3 obtains a narrow background shadow image.

In the first embodiment, description will be given to a case of preventing erroneous distance measurement in a state in which a shadow is generated on a wall if distance measurement is made using a multi-AF (multiple-point distance measurement) by projecting strobe light onto a scene on which an object is present in front of the wall.

Figure 1A:
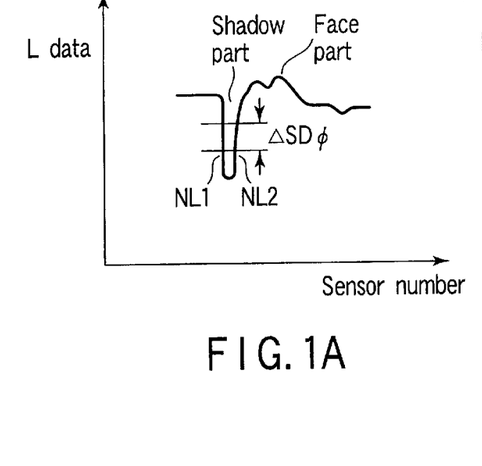
FIGS. 1A and 1B show sensor output distributions for describing a focusing apparatus in the first embodiment according to the present invention.
Figure 1B:
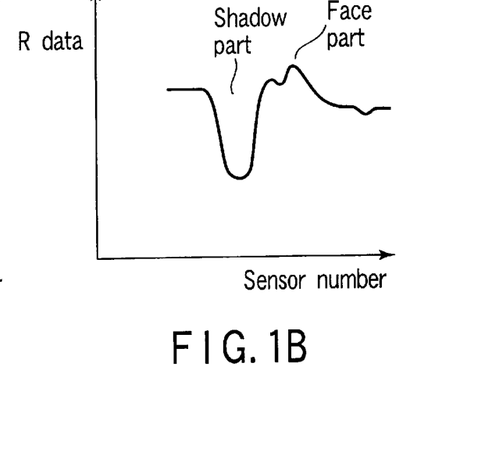

FIGS. 1A and 1B show the states of sensor output distributions obtained in the above-stated state. In FIGS. 1A and 1B, the horizontal axis indicates sensor array pixel number and the vertical axis indicates sensor output. An L sensor array corresponds to the sensor array 7L shown in FIG. 17 and an R sensor array corresponds to the sensor array 7R shown in FIG. 17. As shown in FIGS. 1A and 1B, a shadow part is generated on the side of the image of a face region. The shadow part has a narrower width on the L sensor (FIG. 1A) and a wider width on the R sensor array (FIG. 1B).

Figure 2A:
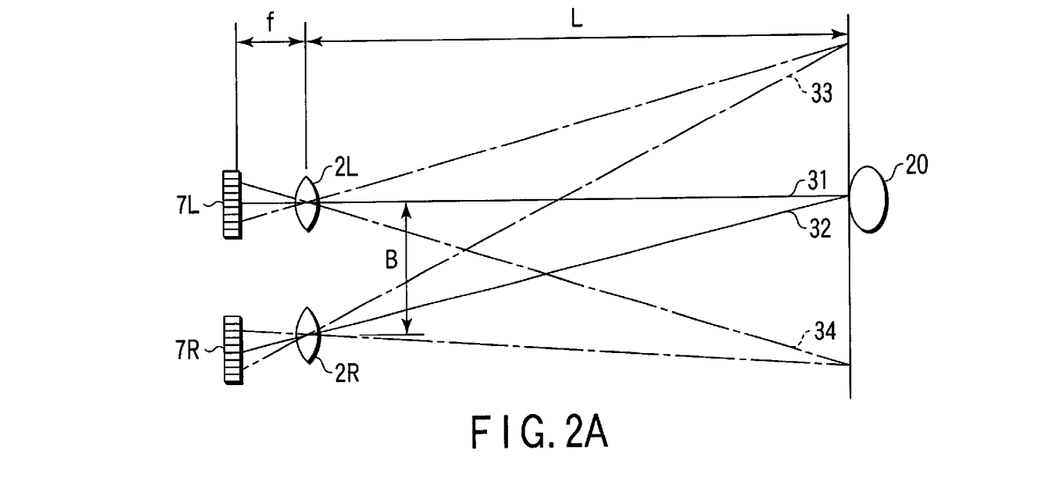
FIG. 2A is an explanatory view for the distance measurement principle to describe the first embodiment.

The distance measurement principle used in the first embodiment will be described with reference to the constitution shown in FIG. 2A.

If the distance L of an object 20 is measured, light beams 31 and 32 are incident on the sensor arrays 7L and 7R located at positions at a focal length f through respective light receiving lenses 2L and 2R having a parallax B therebetween. If images are formed on the sensor arrays 7L and 7R by the light centered around these light beams, the relative positional difference x between the images has a relationship of $x=(s \cdot f)/L$ according to the parallax B, the focal length f and the distance L. Accordingly, if the relative positional distance x is detected from the outputs of the sensor arrays, the object distance can be obtained.

Figure 2B:
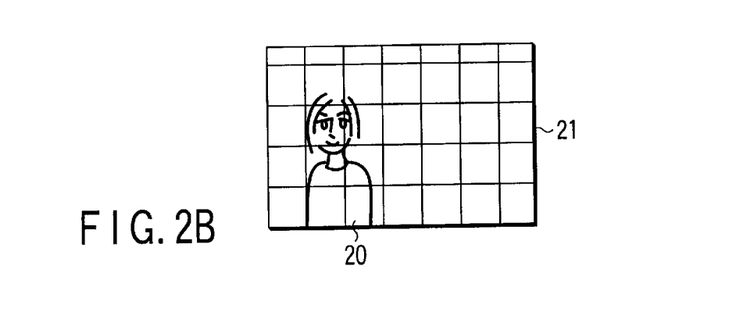
FIG. 2B shows an example of a photographing composition.

Further, if an image at a position shifted by a distance θ is examined, object distances in the directions of the light beams 33 and 34 can be obtained, as well. This distance measurement specification is referred to as multi-AF (multiple-point distance measurement). As shown in FIG. 2B, even if the person 20 in a frame 21 is not present at the center of the frame, the person 20 can be accurately focused on by means of the multi-AF capable of measuring the distances of multiple points.

Figure 3:
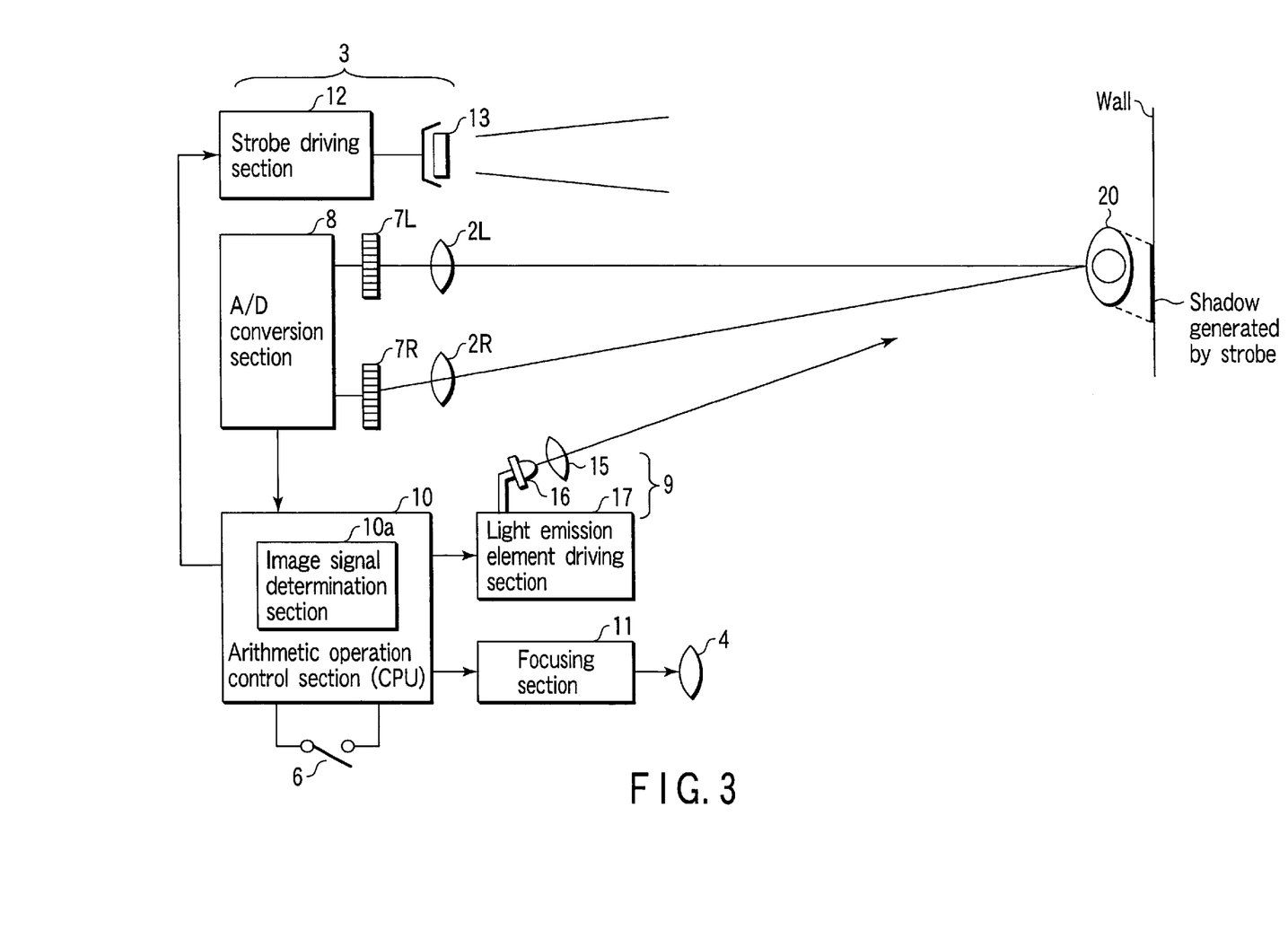
FIG. 3 is a schematic block diagram showing a constitution in which a multi-AF is mounted on a camera in the first embodiment.

FIG. 3 is a schematic block diagram showing a constitution in which the above-stated multi-AF unit is mounted on a camera.

This multi-AF unit consists of a photographic lens 4, a focusing section 11 making the focus adjustment of the photographic lens 4, a release switch 6, a pair of distance measurement lenses 2R and 2L, sensor arrays 7R and 7L receiving optical images formed on the respective lenses 2R and 2L and converting the optical images into electric signals, an A/D conversion circuit 8 A/D converting sensor outputs (or object image signals) into digital signals, an arithmetic operation control section (or CPU) 10 consisting of a one-chip microcomputer controlling the overall multi-AF or the like, and a light emission section 3 consisting of a strobe driving section 12 and an Xe tube 13. The arithmetic operation control section 10 includes an image signal determination section 10a obtaining the above-stated relative positional distance x based on the digitized object image signals, drive-controlling the focusing section 11 from a distance measurement result and focusing the lenses on the object 20.

With the above-stated constitution, when the release switch 6 is depressed, object signals from the sensor arrays 7R and 7L capturing the images of the object 20 are digitized by the A/D conversion circuit 8, the digital signals thus obtained are subjected to an arithmetic processing by the arithmetic operation control section 10 and a distance measurement result is thereby obtained. Based on this distance measurement result, the focusing section 11 drives the photographic lens 4 to focus the lenses on the object 20. At this moment, if the object 20 is dark (i.e., the brightness of the object is low), the light emission section 3 projects light onto the object 20 and distance measurement is carried out using the reflected light of the projected light. Further, the multi-AF has a light projection section 9 consisting of a distance measurement light projection lens 15, an infrared light emission element 16 formed out of a light emission diode (LED) or the like, and a light emission element driving section 17.

Figure 4:
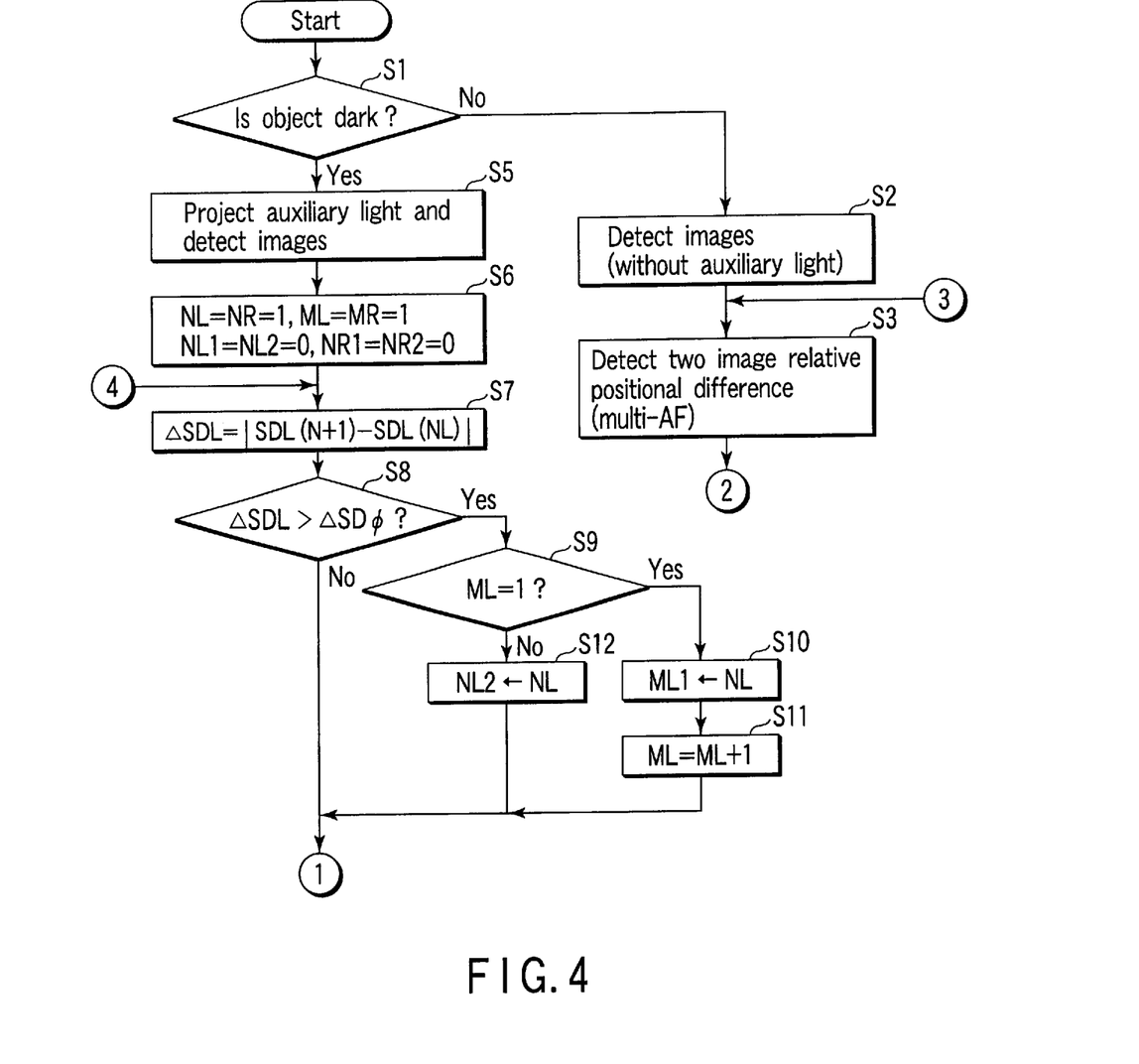
FIG. 4 is the first half of a flow chart for describing the distance measurement carried out by the focusing apparatus in the first embodiment.
Figure 5:
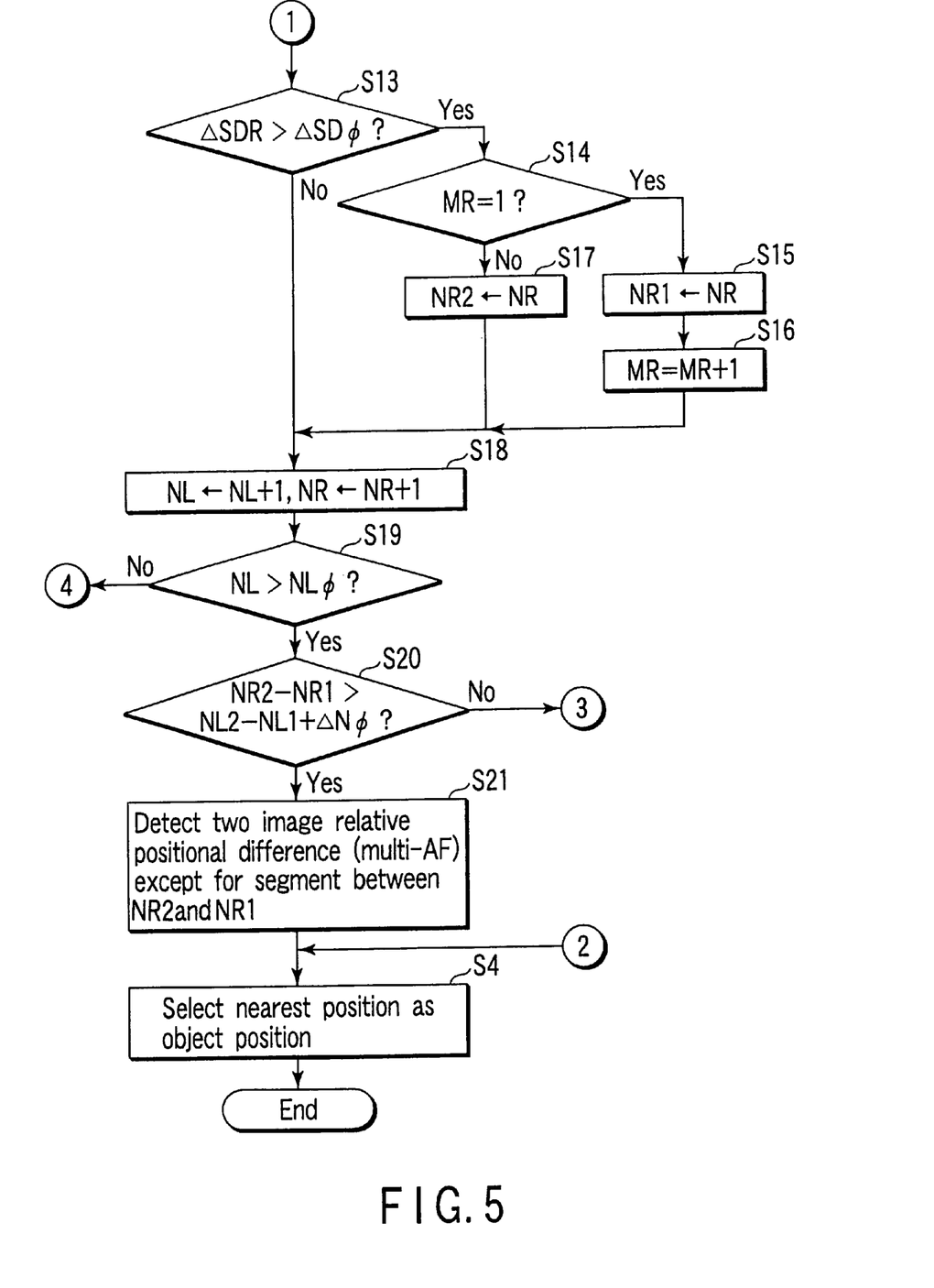
FIG. 5 is the second half of the flow chart for describing the distance measurement carried out by the focusing apparatus in the first embodiment.

Referring to flow charts shown in FIGS. 4 and 5, distance measurement in the first embodiment will be described.

First, it is determined whether or not an object 20 on a photographing target scene is dark, i.e., the brightness of the object 20 is low (step S1). The brightness may be determined based on object image signals obtained by the sensor arrays 7R and 7L or by using the other optical sensor or the like. If it is determined that the object is sufficiently bright relatively to the distance measurement ('NO' in step S1), the sensor arrays 7R and 7L detect images without emitting auxiliary light from the strobe section 3 (step S2). The detection of the relative positional distance between the two images for detecting the images from multiple points or so-called multiple-point distance measurement is carried out (step S3). The nearest position is selected as a position at which the object 20 is present (step S4). It is assumed that this selected position is focused on.

Meanwhile, if it is determined in step S1 that the object is dark ('YES' in step S1), the strobe section 3 emits auxiliary light and the sensor arrays 7R and 7L detect images (step S5). At this moment, variables used in an arithmetic processing to be described later are initialized (step S6). In the initialization, it is assumed that variables indicating sensor pixels NR, NL=1, the numbers of times of determination MR, ML=1, sensor pixel numbers NR1, NR2=0, and NL1, NL2=0. In addition, the difference $\Delta SDL$ between the outputs SDL of the adjacent pixels of the sensor array 7L is obtained as an absolute value while changing the variable NL indicating the sensor pixel (step S7).

Next, a contrast determination is carried out. Namely, it is determined whether or not the absolute value of the difference $\Delta SDL$ is greater than a predetermined value $\Delta SD\phi$ (step S8). If it is determined that the difference $\Delta SDL$ is greater than the predetermined value $\Delta SD\phi$ ('YES' in step S8), it is judged that a shadow exists and sensor pixel numbers corresponding to the edge of a shadow part are obtained. To be specific, it is determined whether or not the number of times of determination is 1 [ML=1?] (step S9). If it is determined that ML=1 ('YES' in the step S9), the NL is set at the sensor pixel number NL1 [NL1←NL] (step S10) and the number of times ML is incremented by one[ML←ML+1] (step S11). If the number of times ML is not 1 ('NO' in step S9), the NL is set at the sensor pixel number NL2 [NL2←NL] (step S12). Step S13, to be described later, follows step S11 or S12.

Next, if the determination result of step S8 shows that the difference $\Delta SDL$ is equal to or smaller than the predetermined value $\Delta SD\phi$ ('NO' in step S8), it is also determined whether or not the absolute value of a difference $\Delta SDR$ is greater than the predetermined value $\Delta SD\phi$ (step S13). If it is determined that the difference $\Delta SDR$ is greater than the predetermined value $\Delta SD\phi$ ('YES' in step S13), sensor pixel numbers corresponding to the edge of the shadow part are obtained. To be specific, it is determined whether or not the number of times of determination MR is 1 [MR=1?] (step S14). If it is determined that the number of times M is 1 ('YES' in step S14), NR is set at the sensor pixel number NR1 [NR1←NR] (step S15), and the number of times MR is incremented by one [MR←MR+1] (step S16). If not MR=1 ('NO' in step S14), the NR is set at the sensor pixel number NR2 [NR2←NR] (step S17). Step S18, to be described later, follows step S16 or S17.

Thereafter, if the determination result of step S13 shows that the difference $\Delta SDR$ is equal to or smaller than the predetermined value $\Delta SD\phi$ ('NO' in step S13), the variables NR and NL are incremented by one, respectively [NL←NL+1, NR←NR+1] (step S18). It is determined whether or not pixels from the first pixel to the last pixel of the sensor array have been covered [NL>NL$\phi$] (step S19). If up to the last pixel have not been covered ('NO' in step S19), the processing returns to step S7 to repeat determinations. On the other hand, if up to the last pixel have been covered ('YES' in step S19), it is then determined whether or not the distance of the shadow on the R side away from the strobe is greater than that on the L side by a predetermined quantity N or more (step S20). To be specific, the distance between NR2 and NR1 and that between NL2 and NL1 correspond to the widths of the shadow parts of the sensor output image signals shown in FIGS. 1A and 1B, respectively [NR2−NR1>NL2−NL1+$\Delta N\phi$]. The distance between NR2 and NR1 and that between NL2 and NL1, i.e., the widths of the shadow parts correspond to the widths of the shadow parts of the sensor output image signals shown in FIGS. 1A and 1B, respectively.

If it is determined in step S20 that the width of the shadow on the R side away from the strobe is greater than that on the L side by the predetermined value N$\phi$ or more ('YES' in step S20), the multi-AF is carried out except for the segment between NR2 and NR1 (shadow part) (step S21). If it is determined in step S20 that the width of the shadow on the R side away from the strobe is equal to or smaller than that on the L side by the predetermined value N$\phi$ ('NO' in step S20), the processing moves to step S3. If the shadow part is not unbalanced or the shadow cannot be eliminated, an ordinary multi-AF is carried out. That is to say, the detection of the two image relative positional distance is carried out in step S3 and the nearest position is selected as a position at which the object is present in step S4. After the selection, the processing returns.

If the nearest position is selected from a plurality of distance measurement results thus obtained in step S4 stated above, the distance of the shadow part is not measured even on such a scene as shown in FIG. 17 and it is, therefore, possible to accurately focus the lenses on the person.

As stated so far, according to the first embodiment, the positional distances between the strobe and a pair of light receiving lenses are utilized to thereby make it possible to accurately measure the distance of a principal object using strobe auxiliary light even on a dark scene on which a wall is present in the background. It is noted that there is no influence of a shadow on a bright scene for which no strobe auxiliary light is required since strobe light is not emitted.

Next, a focusing apparatus in the second embodiment will be described with reference to a flow chart shown in FIG. 6.

The second embodiment is intended to allow the first embodiment stated above to be realized more easily. Using sensor data on either the sensor array L or the sensor array R (in this case, sensor data on the sensor array L), it is only detected whether or not a shadow is present and then multiple-point distance measurement is carried out based on a processing to be described later.

First, as in the case of the first embodiment, it is determined whether or not the object 20 to be photographed is dark (step S31). If it is determined that the object 20 is sufficiently bright ('NO' in step S31), the strobe section 3 does not emit auxiliary light and the sensor arrays 7R and 7L detect images (step S32). Thereafter, the detection of a two image relative positional distance or so-called multiple-point distance measurement is carried out (step S33) and the nearest position is selected as a position at which the object is present (step S34). It is assumed that the selected position is focused on.

On the other hand, if it is determined in step S31 that the brightness of the object is low ('YES' in step S31), the strobe section 3 emits auxiliary light and the sensor arrays 7R and 7L detect images (step S35). At this moment, variables used for an arithmetic processing to be described later are initialized. In the initialization, since only the sensor data on the L side is used, it is assumed that a variable indicating a sensor pixel number N=1, the number of times of determination M=1, and sensor pixel number N1, N2=0.

Then, the difference $\Delta SDL$ between the outputs SDL of the adjacent pixels of the sensor array 7L is obtained as an absolute value while changing the variable NL indicating a sensor pixel (step S37). Next, a contrast is determined, i.e., it is determined whether or not the absolute value of the difference $\Delta SDL$ is greater than a predetermined value $\Delta SD\phi$ (step S38).

If it is determined that the difference $\Delta SDL$ is greater than the predetermined value $\Delta SD\phi$ ('YES' in step S38), sensor pixel numbers corresponding to the edge of a shadow part are obtained. To be specific, it is determined whether or not the number of times of determination M is 1 [M=1?] (step S39). If it is determined that the number of times M is 1 ('YES' in step S39), N is set at the sensor pixel number N1 [N1←N] (step S40) and the number of times M is incremented by one [M=M+1] (step S41). If the number of times M is not 1 ('NO' in step S39), N is set at the sensor pixel number N2 [N2←N] (step S42). Step S43, to be described later, follows step S41 or S42.

Next, if the difference $\Delta SDL$ is equal to or smaller than the predetermined value $\Delta SD\phi$ ('NO' in step S38), the variable N is incremented by one [N←N+1] (step 43) and it is determined whether or not pixels from the first to the last pixel of the sensor array have been covered (N>N$\phi$) (step S44). If up to the last pixel have not been covered ('NO' in step S44), the processing returns to step S37 to repeat determinations. On the other hand, if up to the last pixel have been covered ('YES' in step S44), it is then determined whether or not the edge pixel number N1≠N2≠0 (step S45). If it is not determined that N1≠N2≠0 ('NO' in step S45), the processing moves to step S33 in which the detection of a two image relative positional distance or so-called multiple-point distance measurement is carried out. If it is determined that N1≠N2≠0 ('YES' in step S45), multiple-point distance measurement is carried out except for the length of the shadow between N1 and N2 (step S46). The processing then moves to step S36 in which the nearest position is selected as a position at which the object is present.

As stated so far, according to the second embodiment, since one of the sensor arrays is used and only the presence or absence of a shadow is detected while auxiliary light is employed, a necessary program can be simplified and more accelerated control can be exercised. It is noted that the predetermined quantity N$\phi$ in step S44 is a number corresponding to all the sensor pixels, and a routine for comparing the data difference (or contrast) between the adjacent sensors in respect of the pixel with the predetermined value $\Delta SD\phi$ in step S38 while N is N=1 and for changing pixels in step S43 is the same as that in the first embodiment.

It is further noted that steps S36 to S44 stated above are defined as a sub-routine referred to as "contrast processing", which sub-routine will not be described in detail in the third embodiment to be described later.

Next, a focusing apparatus in the third embodiment will be described.

Figure 7:
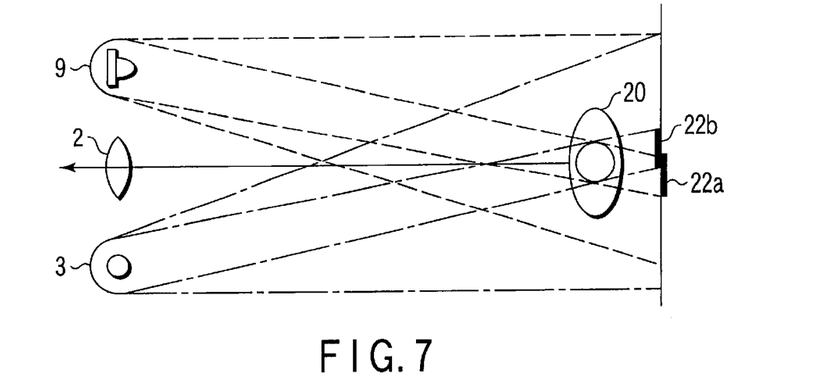
FIG. 7 is a conceptual block diagram of a focusing apparatus in the third embodiment according to the present invention.
Figure 8:
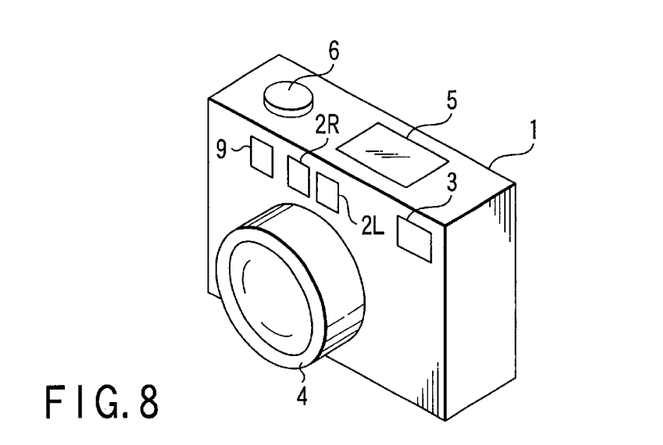
FIG. 8 shows the constitution of the appearance of a camera on which the focusing apparatus in the third embodiment is mounted.

In the third embodiment, as shown in FIGS. 7 and 8, a strobe section 3 is set as the first projection section and a light projection section 9 serving as the second projection section is arranged parallel to the first projection section 3 across a light receiving lens 2. As shown in FIG. 3, the light projection section 9 consists of a distance measurement light projection lens 15, an infrared light emission element 16 0formed out of a light emission diode (LED) or the like, and a light emission element driving section 17. It is noted that only one light receiving lens is shown in FIG. 7 to help understand the description although a pair of light receiving lenses are actually provided.

Figure 9:
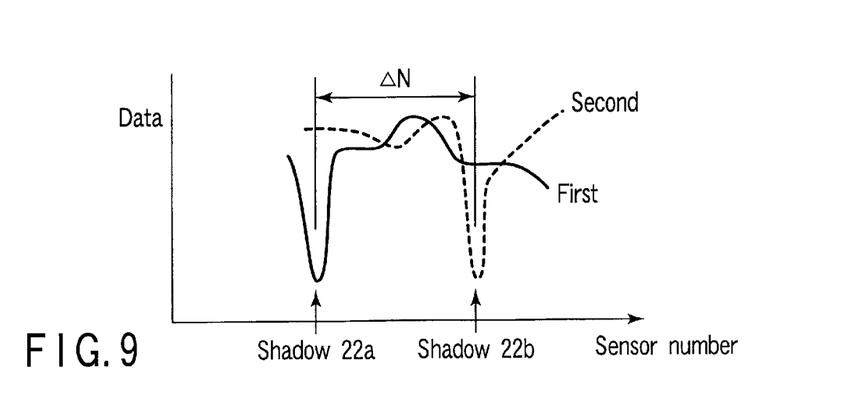
FIG. 9 is a sensor output distribution view for describing the focusing apparatus in the third embodiment.

This light projection section 9 (second light projection section) is arranged at a position (which is a position for reducing the influence of a shadow) different from the position of the strobe section 3 (first light projection section) in the arrangement direction of the light receiving lens 2. For example, the first light projection section 9 is arranged at a position so that the light receiving lenses 2L and 2R are put between the first and second light projection sections. An example of image signals obtained when the first and second light projection sections emit light, respectively has data characteristics as shown in FIG. 9. In FIG. 9, a solid line indicates an image signal when the first light projection section emits light and a dotted line indicates an image signal when the second light projection section emits light.

Namely, if the positions of the light emission sections differ from each other as indicated by shadow parts 22a and 22b shown in FIG. 7, individual shadows are generated at different positions on a wall 21 and a shadow part generated on the image data received by the light receiving lens 2 changes. By detecting this change, it is judged whether or not the image is the image of the shadow or the image of the object 20.

Figure 10:
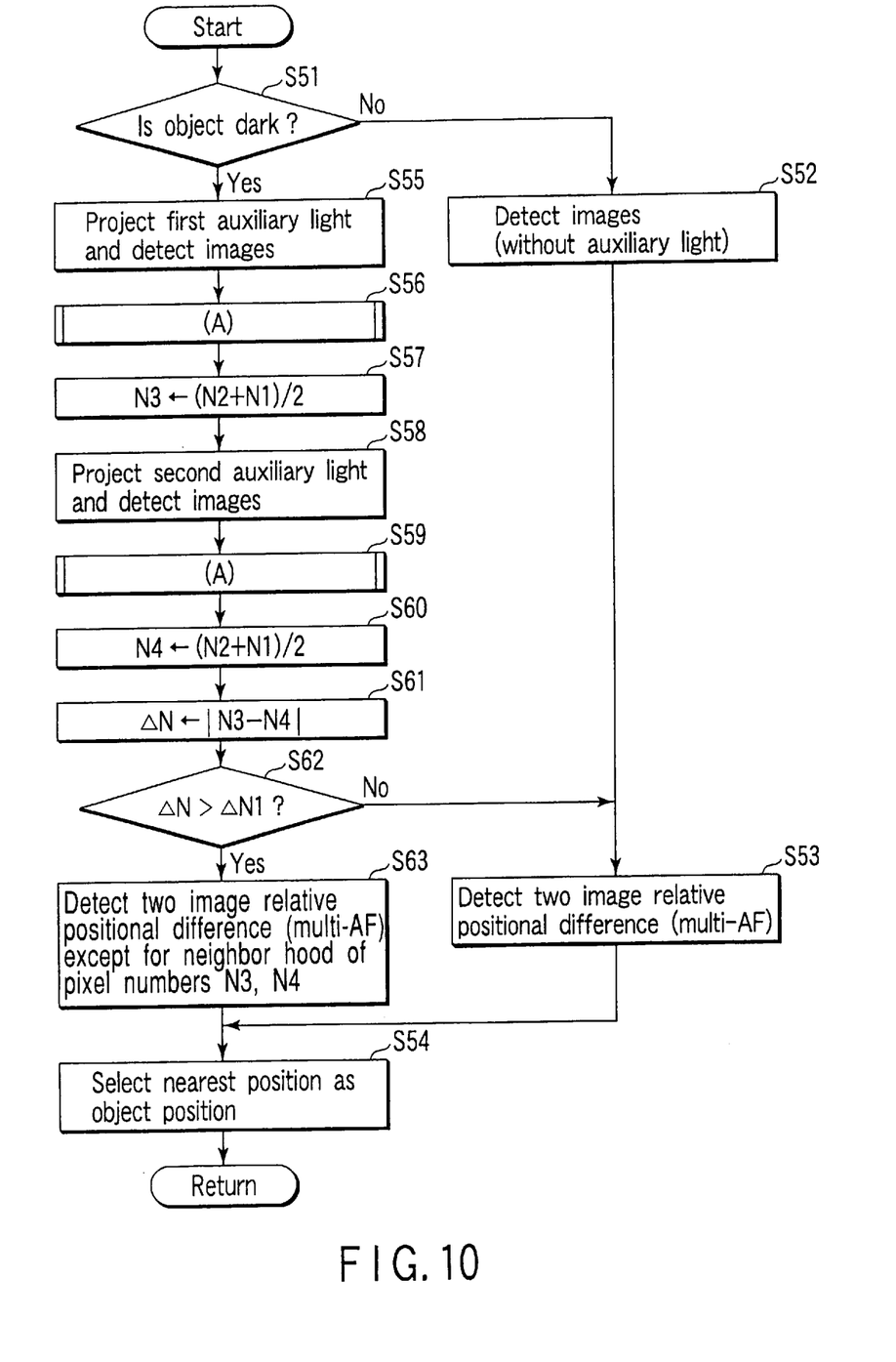
FIG. 10 is a flow chart for describing the distance measurement carried out by the focusing apparatus in the third embodiment.

Referring to a flow chart shown in FIG. 10, distance measurement in the third embodiment will be described.

First, as in the case of the second embodiment, it is determined whether or not the object 20 to be photographed is dark (step S51). If it is determined that the object 20 is sufficiently bright ('NO' in step S51), the sensor arrays 7R and 7L detect images without emitting auxiliary light from the strobe section 3 serving as the first light projection section (step S52). Then, the detection of a two image relative positional difference or so-called multiple-point distance measurement is carried out (step S53) and the nearest position is selected as a position at which the object is present (step S54). It is assumed that this selected position is focused on. On the other hand, if it is determined that the brightness of the object 20 is low ('YES' in step S51), the strobe section 3 emits auxiliary light and the sensor arrays 7R and 7L detect images (step S55).

Figure 6:
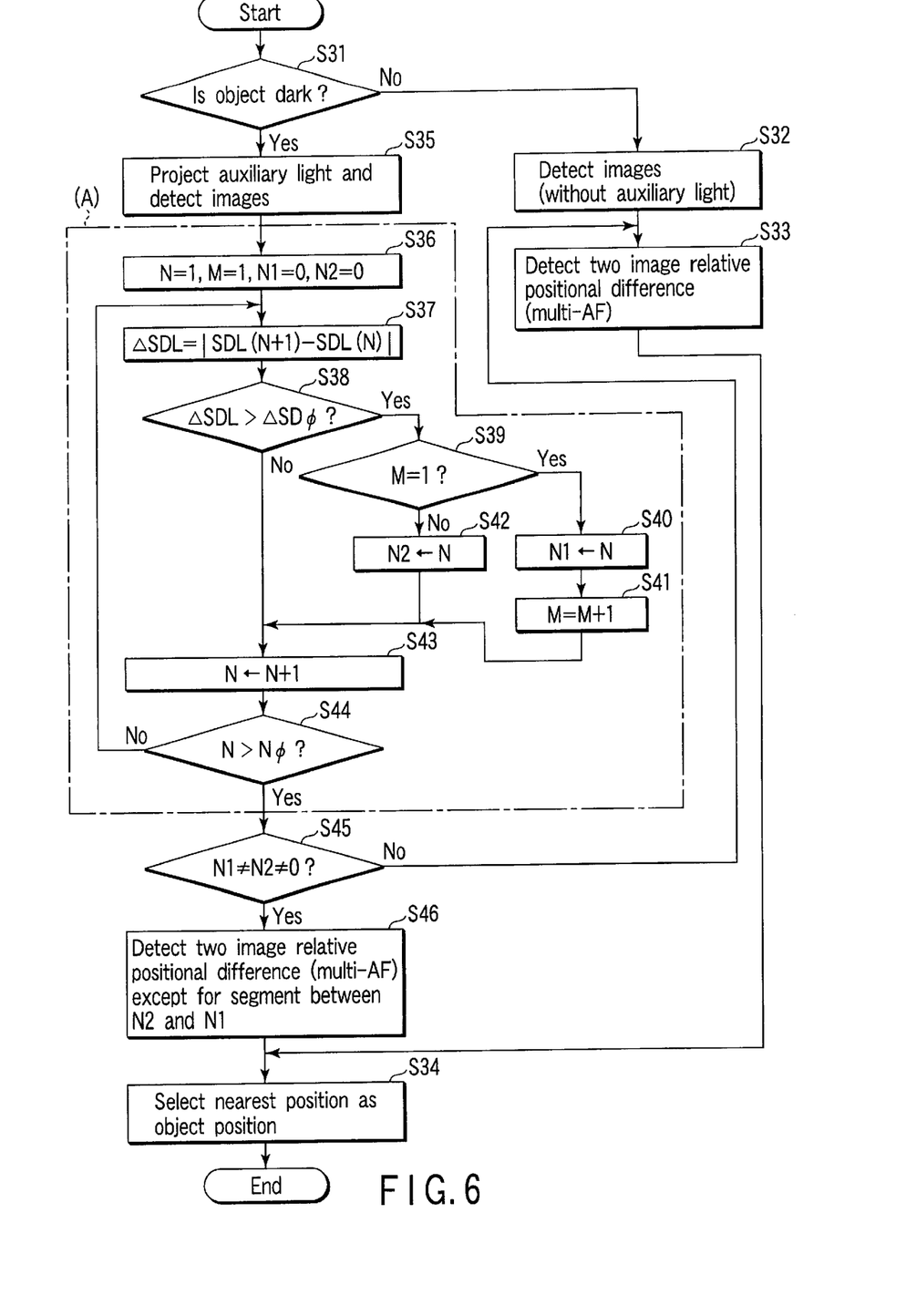
FIG. 6 is a flow chart for describing the distance measurement carried out by a focusing apparatus in the second embodiment according to the present invention.

Thereafter, a "contrast processing" sub-routine from steps S36 to S44 shown in FIG. 6 stated above is executed (step S56). Next, the sensor pixel number N3 is obtained from the average of N2 and N1 by being set at (N2+N1)/2 (step S57). Then, the light projection section 9 serving as the second light projection section emits auxiliary light and the sensor arrays 7R and 7L detect images (step S58). Likewise, the "contrast processing" sub-routine is executed (step S59). Next, the sensor pixel number N4 is obtained from the average of N2 and N1 by being set at (N2+N1)/2 (step S60). In this way, while light emission is carried out twice, i.e., the strobe section 3 and the light projection section 9 emit light, respectively, the edge pixels (N2 and N1) of the shadow part are determined, respectively. Namely, using one light projection section, a shadow part edge pixel determination is carried out and the light projection section is switched over to the other and a shadow part edge pixel determination is carried out. Pixel numbers N3 and N4 at the centers of the shadow parts, respectively are obtained as the average of the pixel numbers N1 and N2.

Next, a difference Δ as shown in FIG. 9 is obtained as the absolute value of the difference between the obtained pixel numbers N3 and N4 (step S61) and it is determined whether or not the position of the shadow has changed while light is projected from these two light sources. That is, the difference ΔN is compared with a predetermined value ΔN1 so as to determine whether or not the position of the shadow has changed (step S62). If it is determined that the position of the shadow has changed ('YES' in step S62), the detection of a two image relative positional difference or so-called multi-AF is carried out except for neighborhood of the pixel numbers N3 and N4 (step S63). On the other hand, if it is determined that the position of the shadow has not changed ('NO' in step S62), the processing moves to step S53 in which the ordinary multi-AF is carried out. Thereafter, the processing moves to step S54 in which the nearest distance is selected out of the obtained distances and distance measurement is completed.

As stated so far, according to the third embodiment, a shadow generated on the wall in the background of the object (or person) 20 is determined by projecting a plurality of auxiliary light beams to measure the distance. Accordingly, even if a shadow is generated in back of the person, this shadow is not focused on and the shadow is eliminated by emitting light from the two light projection sections with different brightness during exposure. In addition, even if an object image has a fine darkness, it is possible to obtain an accurate distance measurement result and to realize accurate focusing on the object.

Next, the fourth embodiment will be described.

Figure 11A:
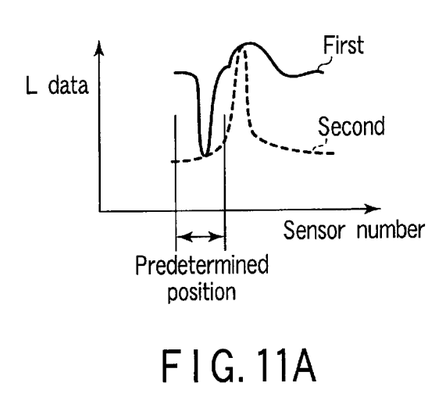
FIGS. 11A and 11B are sensor output distribution views for describing a focusing apparatus in the fourth embodiment according to the present invention.
Figure 11B:
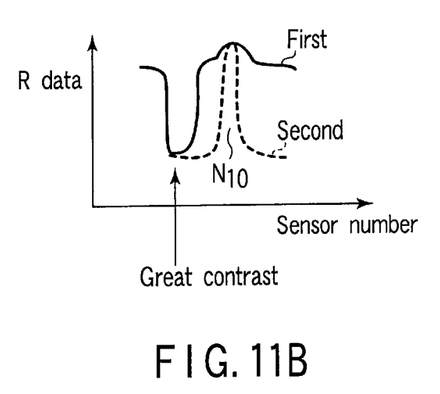

As shown in FIG. 3, if the second light projection section 9 has a constitution in which the control section 10 controls the light emission element driving section 17 and that the infrared light emission element 16 emits auxiliary light through the distance measurement light projection lens 16, then the auxiliary light is converged on the distance measurement light projection lens 15 and projected onto the object 20. Due to this, there is no light flux uniformly spreading as seen in the preceding embodiments and reflected light from the object on the light projection spot appears as dotted lines as shown in FIGS. 11A and 11B, respectively. While assuming that the reflected light is reflection signal light data from the second light projection section 9, if a shadow is generated at the predetermined position of the reflection signal light as indicated by a solid line in each of FIGS. 11A and 11B following the projection of light from the first light projection section (or strobe section) 3, distance measurement is carried out based on the reflection signal light from the second light projection section 9. For example, if the object 20 wears clothes without a contrast, appropriate image signals for obtaining a distance measurement result cannot be obtained using strobe light emitting a uniform light flux during distance measurement. In this case, a shadow on a wall 21 in the background has a sharp contrast, with the result that the shadow is often focused on. Considering this, distance measurement is carried out according to a flow chart shown in FIG. 12.

Figure 12:
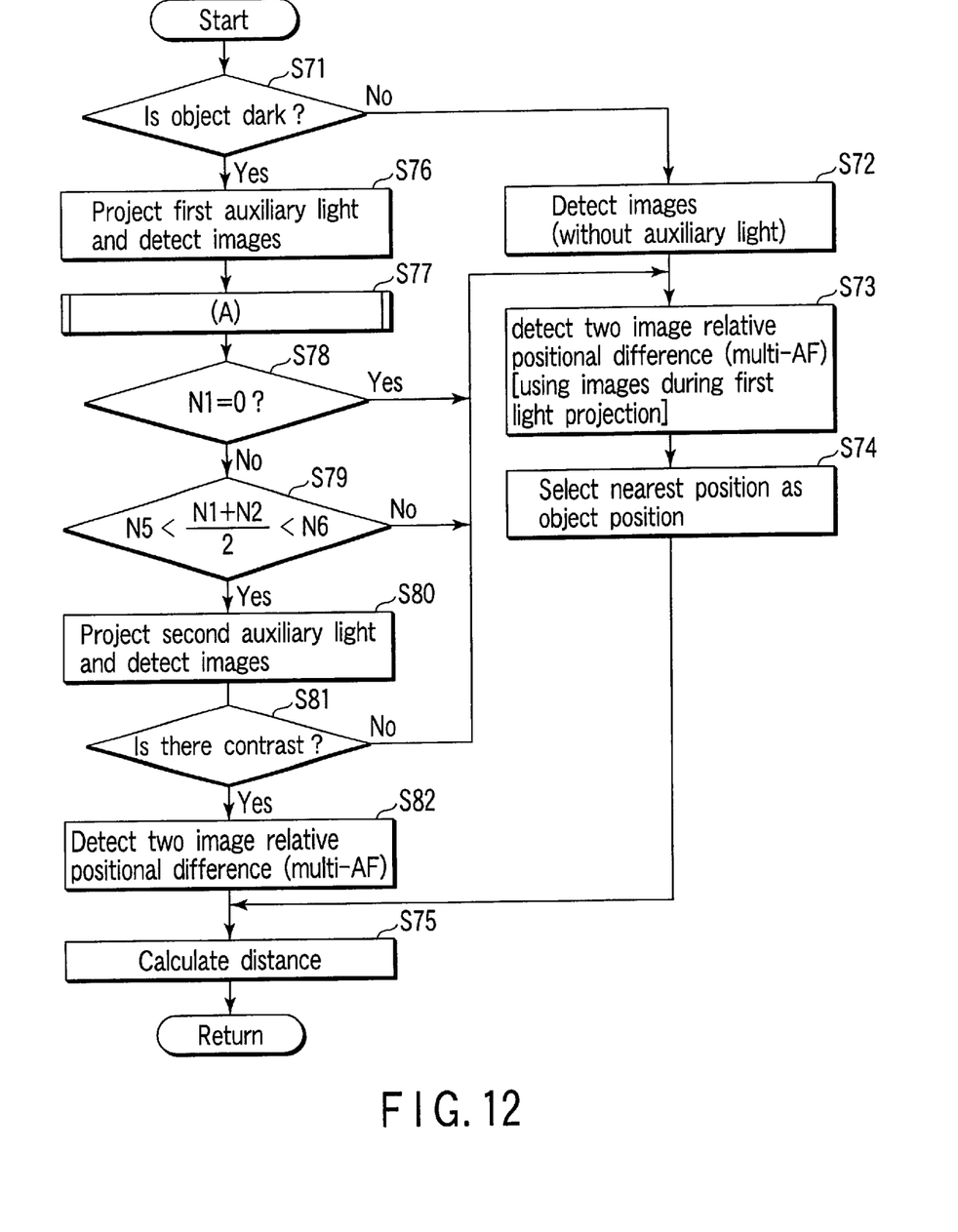
FIG. 12 is a flow chart for describing the distance measurement carried out by the focusing apparatus in the fourth embodiment.

First, it is determined whether or not the brightness of the object 20 to be photographed is low (step S71). If it is determined that the object 20 is sufficiently bright ('NO' in step S71), the strobe section 3 serving as the first light projection section 3 does not emit auxiliary light and the sensor arrays 7R and 7L detect images (step S72). Then, the detection of a two image relative positional difference or so-called multiple-point distance measurement is carried out (step S73) and the nearest position is selected as a position at which the object is present (step S74). The distance of this selected position is calculated (step S75). It is assumed that the selected position having the calculated distance is focused on. On the other hand, if it is determined that the brightness of the object is low ('YES' in step S71), the strobe section 3 emits auxiliary light and the sensor arrays 7R and 7L detect images (step S76).

Thereafter, the above-stated "contrast processing" sub-routine is executed (step S77). Next, it is determined whether or not the sensor pixel number N1 is 0 (step S78). If N1=0 ('YES' in step S78), it is determined that there is no shadow based on the image signals detected by projecting the auxiliary light from the strobe section 3 and the processing moves to step S73. In step S73, the ordinary multiple-point distance measurement is carried out. If it is not determined that N=0 ('NO' in step S78), it is determined that there is a shadow.

Figure 13:
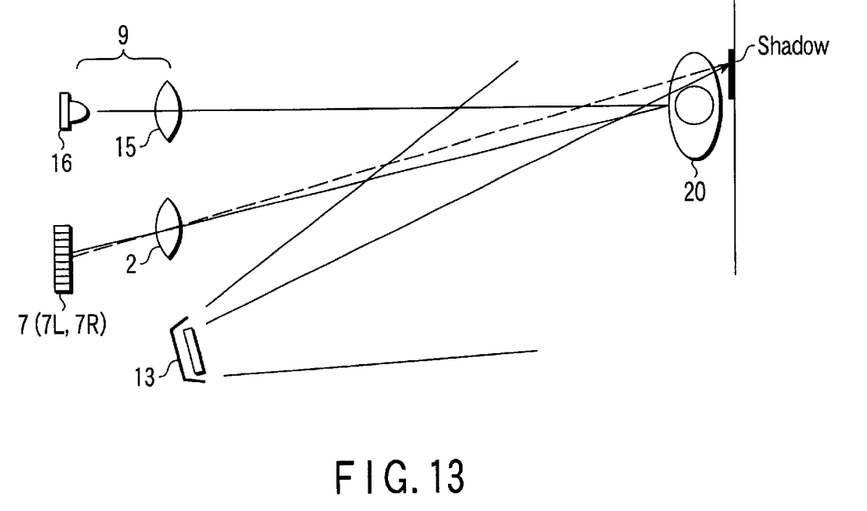
FIG. 13 shows the positional relationship between an object relating to the distance measurement and the focusing apparatus in the fourth embodiment, when viewing the object and the focusing apparatus from above during photographing.

Next, as shown in FIG. 13, the position of this shadow is obtained as (N1+N2)/2 and it is determined whether or not the position of the image on the sensor 7 (7R, 7L) falls within a predetermined positional range (N5<(N1+N2)/2<N6) (step S79). If it is determined that the position of the image on the sensor 7 is out of the predetermined range ('NO' in step S79), the processing moves to step S73 in which the ordinary multiple-point distance measurement is carried out. If it is determined that the position of the image on the sensor 7 is in the predetermined range ('YES' in step S79), the light projection section 9 serving as the second light projection section projects auxiliary light and the sensor arrays 7R and 7L detect images (step S80). Using the detected image signals, it is determined whether or not there is a sharp contrast portion (step S81). If there is no sharp contrast portion ('NO' in step S81), the processing moves to step S73 in which the ordinary multiple-point distance measurement is carried out.

On the other hand, if it is determined that there is a sharp contrast portion ('YES' in step S81), it is then determined that the object 20 is present at a position at which the auxiliary light from the light projection section 9 is effective. According to the image detection result by the second light projection, the detection of a two image relative positional difference is carried out (step S82) and the distance is calculated in step S75 already described above.

As stated so far, according to the fourth embodiment, the first light projection section projecting uniform light and the second light projection section projecting spot light are utilized, thereby making it possible to carry out focusing even to an object having a weak contrast, without the influence of a background shadow.

Figure 14:
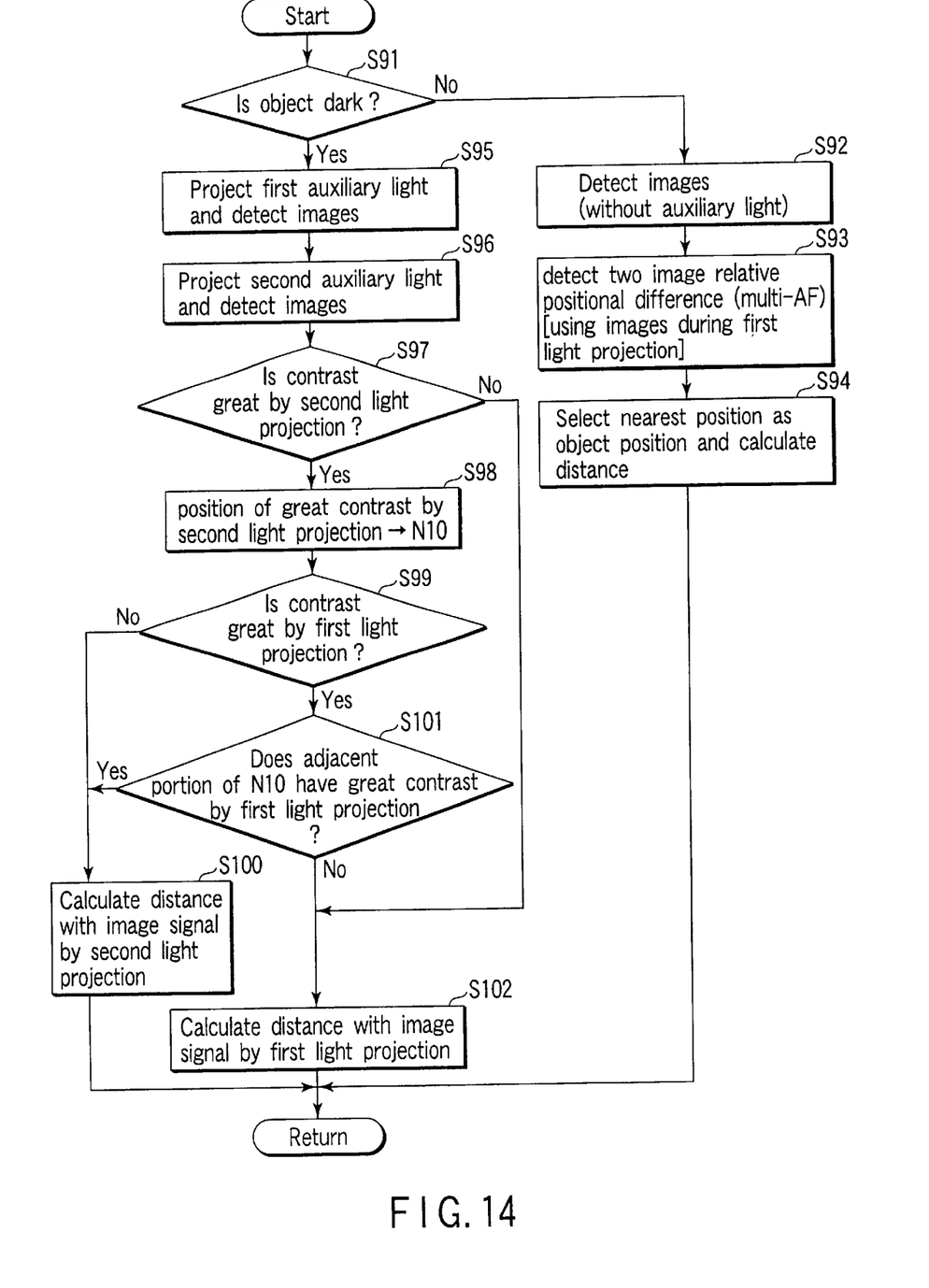
FIG. 14 is a flow chart for describing the distance measurement carried out by a focusing apparatus in the fifth embodiment according to the present invention.

Next, the fifth embodiment will be described with reference to a flow chart shown in FIG. 14.

First, it is determined whether or not the brightness of the object 20 to be photographed is low (step S91). If it is determined that the object 20 is sufficiently bright ('NO' in step S91), the strobe section 3 serving as the first light projection section does not emit auxiliary light and the sensor arrays 7R and 7L detect images (step S92). Then, the detection of a two image relative positional difference or so-called multiple-point distance measurement is carried out (step S93). The nearest position is selected as a position at which the object is present and the distance of the object is calculated (step S94).

On the other hand, if it is determined that the brightness of the object 20 is low ('YES' in step S91), the strobe section 3 emits auxiliary light and the sensor arrays 7R and 7L detect images (step S95). Next, the light projection section 9 serving as the second light projection section emits auxiliary light and the sensor arrays 7R and 7L detect images (step S96). It is then determined whether or not there is a sharp contrast portion in the image signals obtained by the projection of light from the light projection section 9 (step S97). If it is determined that there is no sharp contrast portion ('NO' in step S97), the processing moves to a step S102 to be described later. If it is determined that there is a sharp contrast portion ('YES' in step S97), the contrast position is obtained as pixel number N10 (step S98). This contrast position is obtained from the data shown in FIG. 11B described above.

Thereafter, it is determined whether or not a sharp contrast is obtained from the first light projection at the pixel number N10 (step S99). If it is determined that no sharp contrast is obtained ('NO' in step S99), image signals obtained by projecting light from the light projection section 9, i.e., the second light projection, are prioritized and a distance is calculated (step S100). On the other hand, if it is determined that a sharp contrast is obtained ('YES' in step S99), it is then determined whether or not a sharp contrast portion as shown in FIG. 11B is present on the adjacent portion of the pixel number N10 by projecting light from the strobe section 3, i.e., the first light projection (step S101). If it is determined that a sharp contrast portion is present on the adjacent portion ('YES' in step S101), the processing moves to step S100 in which the image signals obtained by projecting light from the light projection section 9 are prioritized. On the other hand, if it is determined that no sharp contrast portion is present on the adjacent portion ('NO' in step S101), the image signals obtained by projecting light from the strobe section 3, i.e., the first light projection are prioritized and a distance is calculated (step S102).

As can be seen, according to the fifth embodiment, by selecting the image signals obtained by projecting light from the strobe section 3, i.e., the first light projection or the image signals obtained by projecting light from the light projection section 9, i.e., the second light projection, it is possible to obtain the same advantages as those in the preceding embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focusing apparatus for focusing on an object based on object image signals outputted from a sensor, comprising:
   a light projection section projecting auxiliary light for focusing, onto said object;
   a detection section detecting an object image signal corresponding to a part of a shadow of the object generated following projection of the auxiliary light, among the object image signals outputted from said sensor when said auxiliary light is projected; and
   a control section conducting focusing control based on the object image signals outputted from the sensor when said auxiliary light is projected except for the object image signal corresponding to the part of the shadow and detected by said detection section.

2. A focusing apparatus according to claim 1, wherein the focusing apparatus comprises a determination section determining whether the object is bright or dark based on said object image signals; and
   said light projection section fails to project the auxiliary light if said determination section determines that said object is bright.

3. A focusing apparatus according to claim 2, wherein said light projection section projects the auxiliary light if said determination section determines that said object is dark.

4. A focusing apparatus according to claim 1, wherein said light projection section is a strobe light emission section.

5. A focusing apparatus for focusing on an object based on object image signals outputted from a sensor array, comprising:
   a brightness detection section detecting brightness of said object;
   a light projection section projecting auxiliary light for focusing, onto said object according to a detection result of said brightness detection section;
   a detection section detecting a part forming a contrast equal to or greater than a present, predetermined contrast, based on the object image signals outputted from said sensor array when said auxiliary light is projected; and
   a control section controlling focusing control based on the object image signals outputted from said sensor array except for an object image signal corresponding to the part detected by said detection section.

6. A focusing apparatus according to claim 5, wherein said sensor array is constituted out of a pair of sensor arrays, each of the pair of sensor arrays detecting the object image signals obtained from a plurality of optical paths including an object position.

7. A focusing apparatus according to claim 6, wherein said control section conducts the focusing control to focus on the object at a nearest position, based on the object image signals obtained from said plurality of optical paths.

8. A focusing apparatus according to claim 5, wherein said detection section detects a part forming said contrast by sequentially comparing outputs of adjacent pixels of said sensor array.

9. A camera including a focusing apparatus for focusing on an object based on object image signals outputted from a pair of sensor arrays and obtained from a plurality of optical paths including an object position, the camera comprising:

a brightness detection section detecting brightness of said object;

a light projection section projecting auxiliary light for focusing, onto said object according to a detection result of said brightness detection section;

a detection section detecting a sensor pixel number forming a contrast equal to or greater than a preset, predetermined contrast, based on the object image signals outputted from said pair of sensor arrays when said auxiliary light is projected;

an arithmetic operation section operating a first width of a part corresponding to a dark portion formed by projecting said auxiliary light based on the sensor pixel number detected by said detection section based on the object image signals outputted from one, right sensor array out of said pair of sensor arrays, and operating a second width of the part corresponding to the dark portion formed by projecting said auxiliary light based on the sensor pixel number detected by said detection section based on the object image signals outputted from the other, left sensor array out of said pair of sensor arrays;

a comparison section comparing said first, right width operated by said operation section with said second, left width operated by said operation section; and a control section conducting individual focusing control according to a comparison result of said comparison section.

10. A camera according to claim 9, wherein said light projection section is a strobe light emission section.

11. A camera according to claim 10, wherein said pair of sensor arrays are arranged side by side;

said one sensor array is a sensor array away from said strobe light emission section; and said the other sensor array is a sensor array close to said strobe light emission section.

12. A camera according to claim 11, wherein said control section conducts the focusing control based on the object image signals outputted from said sensor arrays except for an object image signal outputted from a part corresponding to the first width if the comparison result that said first width is larger than said second width is obtained by said comparison section.

13. A camera according to claim 11, wherein said control section conducts the focusing control based on all outputs of said sensor arrays if the comparison result that said first width is smaller than said second width is obtained by said comparison section.

14. A camera according to claim 11, wherein said control section selects a nearest position based on the object image signals outputted from said pair of sensor arrays and obtained from the plurality of optical paths.

15. A camera according to claim 13, wherein said control section selects a nearest position based on the object image signals outputted from said pair of sensor arrays and obtained from the plurality of optical paths.

16. A camera comprising:

a first light projection section projecting first auxiliary light for focusing, onto an object;

a second light projection section projecting second auxiliary light for focusing, onto said object;

a first detection section detecting a first object image signal outputted from a sensor when said first auxiliary light is projected;

a second detection section detecting a second object image signal outputted from the sensor when said second auxiliary light is projected; and a third detection section detecting a positional difference for a part corresponding to a shadow of the object generated on the respective object image signals based on said first and second object image signals, and discriminating the object from the shadow.

17. A camera according to claim 16, wherein the camera further comprises a control section conducting focusing control based on a detection result of said third detection section; and said control section conducts the focusing control for parts other than the part of said shadow if a detection result that there is a positional difference for the part corresponding to the shadow of said object is obtained by said third detection section.

18. A focusing apparatus for focusing on an object based on object image signals outputted from a sensor, comprising:

a first light projection section projecting first auxiliary light having a uniform light intensity for focusing, onto an object;

a second light projection section projecting second auxiliary spot light for focusing, onto said object;

a first detection section detecting a first object image signal outputted from said sensor when said first auxiliary light is projected;

a second detection section detecting a second object image signal outputted from said sensor when said second auxiliary light is projected;

a third detection section detecting a part corresponding to a shadow of the object generated on each of the object image signals, based on at least said first object image signal; and a control section conducting focusing control based on one of said first object image signal and said second object image signal, based on a detection result of said third detection section.

19. A focusing apparatus according to claim 18, wherein said control section conducts the focusing control based on said first object image signal if said third detection section fails to detect a part having a great contrast from said first object image signal.

20. A focusing apparatus according to claim 18, wherein said control section conducts the focusing control based on said second object image signal if said third detection section detects a part having a great contrast from said second object image signal.

21. A focusing apparatus according to claim 18, wherein said first light projection section is a strobe light emission section.

22. A focusing apparatus according to claim 19, wherein said second light projection section is an infrared light emission element.

23. A focusing apparatus for focusing on an object based on object image signals outputted from a sensor, comprising:

a first light projection section projecting first auxiliary light having a uniform light intensity for focusing, onto an object;

a second light projection section projecting second auxiliary spot light for focusing, onto said object;

a first detection section detecting a first object image signal outputted from said sensor when said first auxiliary light is projected;

a second detection section detecting a second object image signal outputted from said sensor when said second auxiliary light is projected; and a control section conducting focusing control based on one of said first object image signal and said second object image signal, according to whether a part having a great contrast is present on one of said first object image signal and said second object image signal.

24. A focusing apparatus according to claim 23, wherein said control section conducts the focusing control based on said first object image signal if it is determined that the part having the great contrast is absent on said second object image signal.

25. A focusing apparatus according to claim 23, wherein said control section conducts the focusing control while prioritizing said second object image signal if it is determined that the part having the great contrast is present on said second object image signal and if said first determination section determines that the part having the great contrast is absent on said first object image signal.

26. A focusing apparatus according to claim 23, comprising:

a determination section obtaining one of a first result that a part determined to have the great contrast is "present" on said first object image signal on an adjacent portion of a sensor pixel number of the part determined to have the great contrast on said second object image signal, and a second result that the part determined to have the great contrast is "absent" on said first object image signal on the adjacent portion of the sensor pixel number of the part determined to have the sharp contrast on said second object image signal.

27. A focusing apparatus according to claim 23, wherein said control section conducts the focusing control based on said second object image signal if said first result is obtained by said determination section.

28. A focusing apparatus according to claim 23, wherein said focusing control section conducts the focusing control based on said first object image signal if said second result is obtained by said determination section.

* * * * *